United States Patent [19]
Mozafari

[11] Patent Number: 5,370,430
[45] Date of Patent: Dec. 6, 1994

[54] SUPER MAGNET BUMPERS

[76] Inventor: Mehdi Mozafari, 5959 Texhoma Ave., Encino, Calif. 91316-1208

[21] Appl. No.: 203,395

[22] Filed: Mar. 1, 1994

Related U.S. Application Data

[63] Continuation-in-part of Ser. No. 916,897, Jul. 20, 1992, abandoned, and a continuation-in-part of Ser. No. 38,648, Mar. 29, 1993, abandoned.

[51] Int. Cl.$^5$ .............................................. B60R 19/02
[52] U.S. Cl. ............................. 293/120; 293/DIG. 6
[58] Field of Search ......... 293/102, 120, 132, DIG. 6, 293/128

[56]  References Cited
U.S. PATENT DOCUMENTS 3,147,176  9/1964  Haslam ...................... 293/DIG. 6 X
3,831,847  8/1974  Serritella ................... 293/DIG. 6 X Primary Examiner—Joseph Pape
Attorney, Agent, or Firm—Pollock, Vande Sande & Priddy

[57] ABSTRACT

A bumper assembly for attachment to a vehicle body, The bumper assembly includes at least one elongate bumper member about as long as a width of the vehicle body. The bumper member is attached to a surface of the vehicle body facing a direction of travel of the vehicle. Also included is at least one magnet member. The magnet member includes a magnetic housing member and a magnetic keeper plate member. The housing member is attached to a frame of the vehicle facing the direction of travel of the vehicle. The keeper plate member is attached to the bumper member co-axially with the housing member. The keeper plate member and the housing member are separated by a gap and repel each other when the bumper assembly is attached to the vehicle.

8 Claims, 3 Drawing Sheets

SUPER MAGNET BUMPERS

RELATED APPLICATIONS

This application is a continuation-in-part of related U.S. patent application Ser. No. 07/916,897 filed Jul. 20, 1992, now abandoned, and co-pending U.S. patent application Ser. No. 08/038,648, filed Mar. 29, 1993, now abandoned.

FIELD OF THE INVENTION

The invention relates to bumpers for protecting vehicles and in particular to front and rear bumpers for a vehicle which are held in place using magnets. Using magnetic force to withhold collision force before the force reaches the passenger, adding to the withholding power of bumper without adding to the weight of an automobile.

BACKGROUND OF THE INVENTION

Automobile safety and associated issues, such as automobile repair and insurance cost, continue to be an area of intense public interest. The public and consumer groups continue to demand safer cars and the automobile industry continues to resist change. Meanwhile, the state of the art in automobile design continues to evolve.

It is well known that some of the most dangerous and potentially damaging types of automobile accidents, both to the automobile as well as the driver and any passengers, is the head-on collision. Many recent safety developments, such as the airbag and automatically retracting seatbelts, have been directed towards increasing the safety of passengers in such collisions. Other developments designed to protect the occupants of a vehicles in a head-on collision have been directed toward automobile design. Changes which have been made to the design of automobiles include the incorporation of crumple zones at the front and rear of automobiles and the inclusion of side-impact beams in the doors of automobiles. Crumple zones are designed to collapse in the event of a head-on collision, thereby absorbing the force of the collision before the force reaches the passenger compartment. It would be desirable to have an additional structural member which could help to absorb and deflect the force of a collision.

An additional area of concentration in automobile design is the development of bumpers which are capable of withstanding low speed crashes without being damaged. Such crashes, on the order of five miles per hour, occur quiet frequently and can cost hundreds or thousands of dollars to repair the damage to the cars bumpers. Ideally, a car should have a bumper which is capable of withstanding such crashes and even higher speed crashes without being damaged. However, most automobile manufacturers provide relatively weak bumpers on their cars which are easily damaged and allow the force of an impact to reach passengers and causes great losses, both in terms of personal injury and death and also financial.

Inter-related with the above described problems of vehicle and occupant safety and resistance to damage is the issue of the ease.

It is not known in the art to provide a bumper for a vehicle which increases the safety of the vehicle, is resistant to damage in both high and low speed crashes. Such a bumper could dramatically reduce medical and repair costs as well as insurance costs. In view of the above, such a bumper would solve many problems existing in automobile safety design.

SUMMARY OF THE INVENTION

The present invention provides a repelling power of 60,000 lbs. of force of impact on bumpers without adding extra weight to bumpers. According to preferred aspects, the present invention provides a bumper assembly for attachment to a vehicle frame and/or body. The bumper assembly includes at least one elongate bumper member being about as long as a width of the vehicle body. The at least one bumper member may be attached to the front end of the vehicle body which faces the direction of travel of the vehicle.

The bumper assembly also includes at least one magnet. The magnet includes two parts, a magnetic housing member, which may be attached to the vehicle body and/or frame adjacent the at least one bumper member. The magnet also includes a keeper plate attached to the at least one bumper member co-axially with the housing member and held in place on the vehicle and/or body. The keeper plate member and the housing member are separated by a gap and repel each other when the bumper assembly is attached to the vehicle. The bumper assembly is capable of absorbing a substantial portion of the force of a frontal collision with another object or another vehicle and also of transmitting at least some of that force to other parts of the vehicle body and/or frame.

DETAILED DESCRIPTION OF THE PREFERRED EMBODIMENTS

Figure 1:
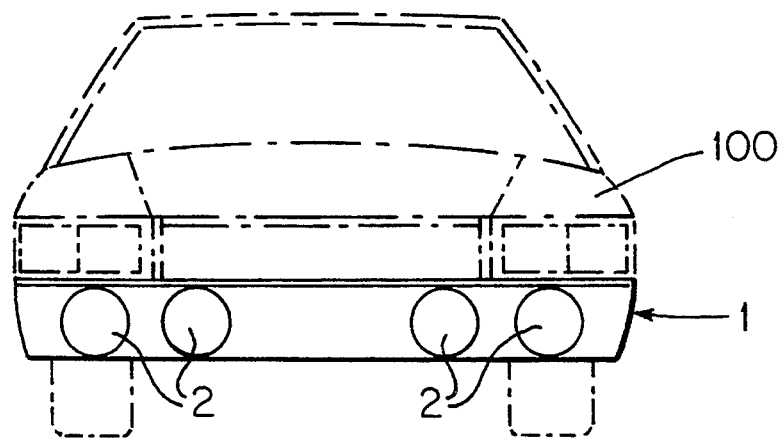
FIG. 1 represents a front cross-sectional view of a bumper according to one embodiment of the present invention.

As seen in FIG. 1, the present invention bumper assembly includes a bumper 1 secured to a vehicle 100 and at least one two part magnet 2. The magnets may be attached to the vehicle bumpers to the front of a vehicle, in the direction that the vehicle travels and/or the rear of the vehicle, in the opposite to the direction of travel of the vehicle. It is the design and operation of the magnets which, among other things, help to create an effect of the bumper in reducing the destructive effect of a collision.

Figure 2:
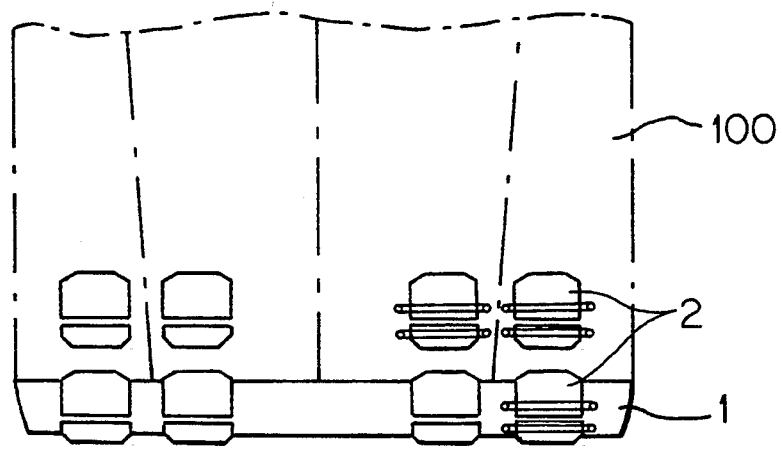
FIG. 2 represents an overhead cross-sectional view of the embodiment shown in FIG. 1.

The bumpers may be made of rubber, plastic, metal or any other suitable material from which bumpers may be made. In preferred embodiments, the bumper assembly includes a plurality of the two-part magnets. As seen from above in FIG. 2, the magnets 2 may be arranged in two rows with one row being directly in front of the other. The two rows preferably are parallel and the magnets in the one row should have their axes lined up with the adjacent magnet in the adjacent row. The outer row of magnets is at least partially contained within and/or surrounded by the bumper.

Figure 3:
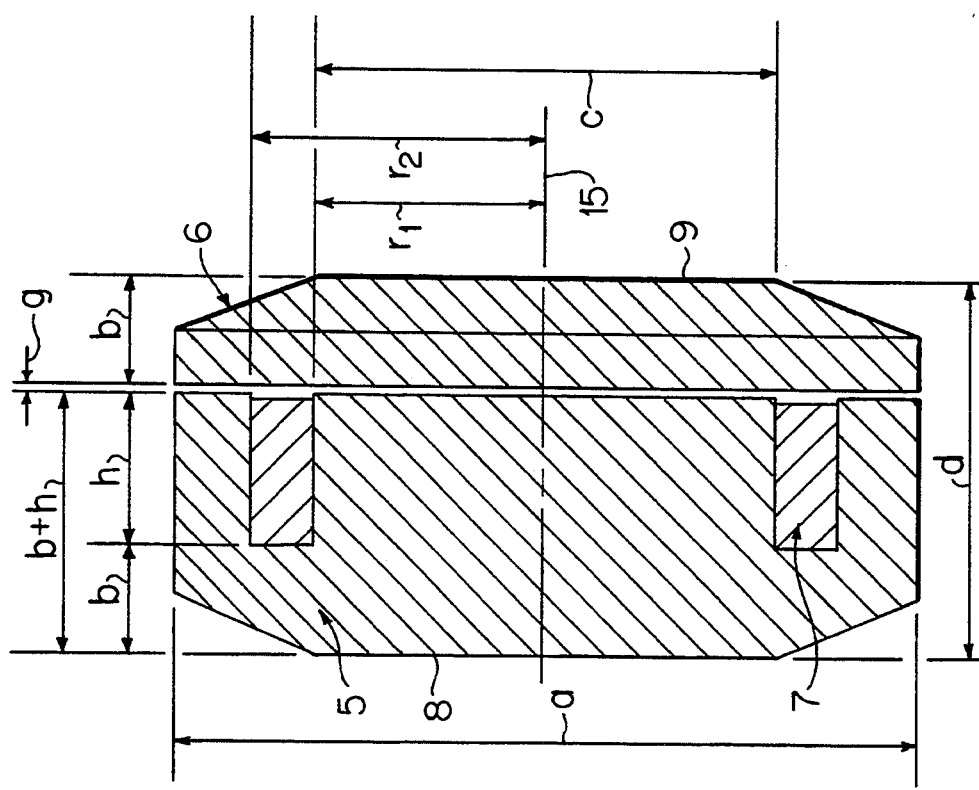
FIG. 3 represents a cross-sectional view of a magnet used to withstand a force of impact in an accident up to 7,500 pounds.

As seen in cross section in FIG. 3, each magnet includes at least two pieces. The two pieces include a housing member 5 and a keeper plate 6. The housing member houses windings 7 which include electromagnets which at least partially generate the magnetic repelling force which create a force which at least partially contributes to the effectiveness of the bumper(s). The electromagnets are powered by a power source(not shown). The magnets also include a keeper plate 6 which is physically separated from the housing.

Each part of the two part magnets may be attached to a vehicle in a different manner. For instance, housing member 5 and keeper plate 6 may be sandwiched inside of the bumper and secured with screws. Alternatively, the vehicle may include a receiving member for receiving the housing member and then the housing member may be secured therein with bolts or by welding.

Screws, bolts, welding, adhesive or other means may also be used. In some embodiments, a rubber bumper member may either incorporate or may be secured to a metal frame which is then attached to the vehicle frame. The keeper plate may be attached to the bumper frame using screws, bolts, welding or any other suitable means.

Figure 2A:
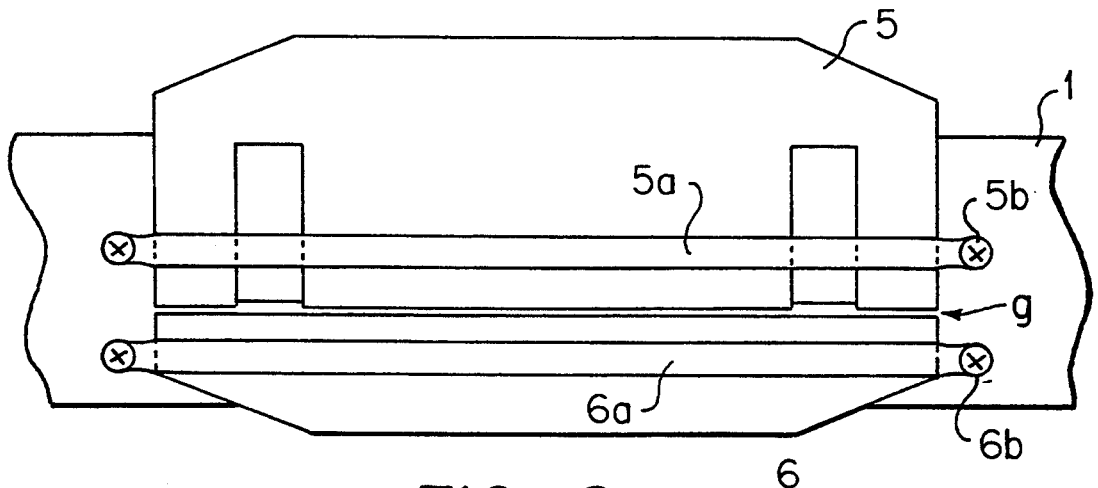
FIG. 2A represents an overhead cross-sectional view of one embodiment of how to sandwich magnets inside the bumper.

FIG. 2A shows one example of a means for attaching the magnets to a vehicle. In FIG. 2A, each magnet member is attached to the bumper using securing members 5a and 6a. The securing members are secured to the bumper or vehicle frame member with, for example, screws 5b and 6b.

Preferably, regardless of how the magnet members of the magnet are attached to the vehicle, preferably, the housing members and the keeper plate of each magnet are aligned to ensure that the two parts of the magnets repel each other.

Although the magnets of the present invention may be formed in any size suitable for use on a car bumper as according to the present invention however, preferably, the magnets of the present invention are formed in a size which is the best balance between the size of the magnet and the strength of the magnet. According to the embodiment shown in FIGS. 1-4, the magnets are round and have a diameter designated a in FIG. 3. In the embodiment shown in FIGS. 1-4, the magnets are about twelve inches in diameter. The two members of the magnets are separated from each other by about 0.02 inches at flat surfaces which have the maximum cross sectional area of the magnets.

As seen in FIG. 3, the housing member and the keeper plate member are separated by the distance g. In the embodiment shown in FIG. 3, g preferably is approximately 0.020 inch apart when the two magnet members are placed in position in the bumper assembly the electromagnet in the housing is activated. The ends of the housing member and the keeper plate member opposite the contact surfaces of the two members are preferably tapered from the full diameter of the magnet down to a smaller dimensions as shown in FIG. 2A.

As seen in FIG. 3, the outer surfaces 8 and 9 of the magnet are about $2r_1$ in diameter. In the embodiment shown in FIG. 3, 2r preferably is about 7.50 inches. With the two magnets in correctly positioned in the bumper assembly and the electromagnet turned on, the thickness of the entire magnet, including the housing member and the keeper plate member, is represented by d. In the embodiment shown in FIG. 3, d is approximately 6.30 inches.

As discussed below, magnet with these dimensions are capable of producing a repelling force between the two parts of each magnet of approximately 7,500 pounds. Therefore, it will take approximately 7,500 pounds of force to close the gap between the magnets. This repelling force between the magnets allows the bumper assembly to withstand the force of a collision much more effectively than conventional bumpers.

Figure 4:
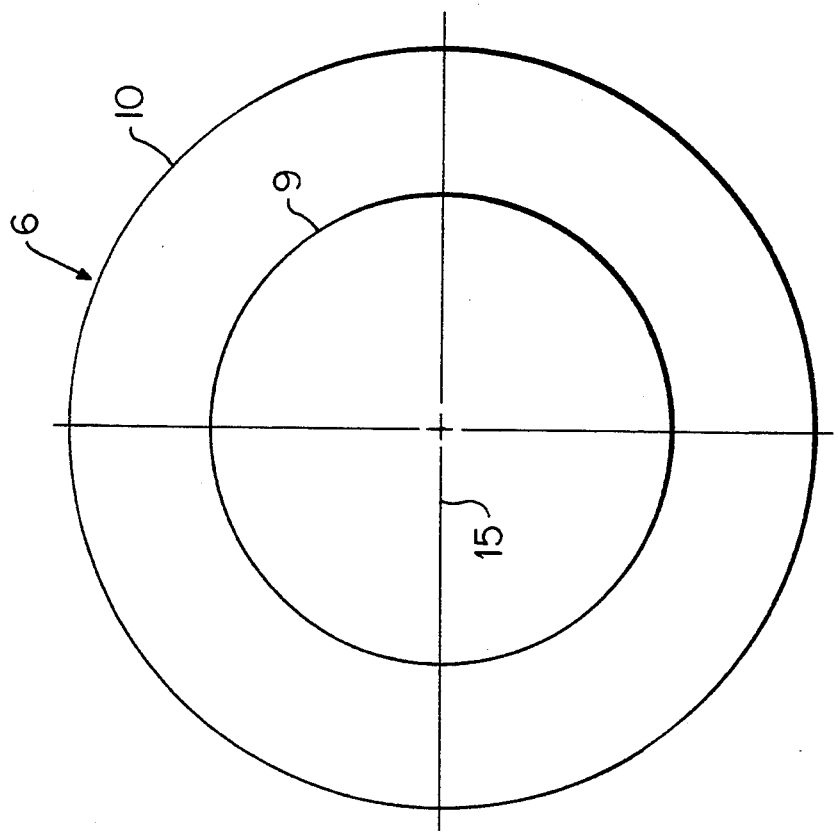
FIG. 4 represents a front view of the magnet shown in FIG. 3.

FIG. 4 shows a front view of the keeper plate member of the present invention. The inner circle 9 represents the outer surface of the keeper plate member as seen in FIG. 3 the outer circle 10 represents the full diameter of the magnet. As further seen in FIG. 3, the thickness of the keeper plate member of the magnet is represented by b. In the embodiment shown in FIG. 3, the keeper plate is about 1.90 inches thick.

As shown in FIG. 3, the thickness of the housing member is represented by b+h. In this formula, b represents the thickness of the housing member between the outer wall 8 and the edge of the winding 7. The thickness of the keeper plate preferably is the same as the distance from the edge of the windings to the outer surface 8 of the housing member. In the embodiment of the magnet shown in FIG. 3, b+h, the thickness of the housing member, is about 4.4 inches thick. In the embodiment seen in FIG. 3, b is about 1.90 inches.

The height of the windings included in the housing member is represented by the letter h in FIG. 3. In the embodiment shown in FIGS. 1-4, the windings are approximately 2.50 inches high. Preferably, the windings are located in the area a distance from the central axis of the magnet designated by $r_1$ and $r_2$ in FIG. 3. In the embodiment shown in FIG. 3, the windings are located in a ring from about 3.75 inches to about 4.75 inches from the central axis 15 of the magnet. Therefore, the windings are approximately one inch thick and extend completely about the magnet in this ring.

Figure 5:
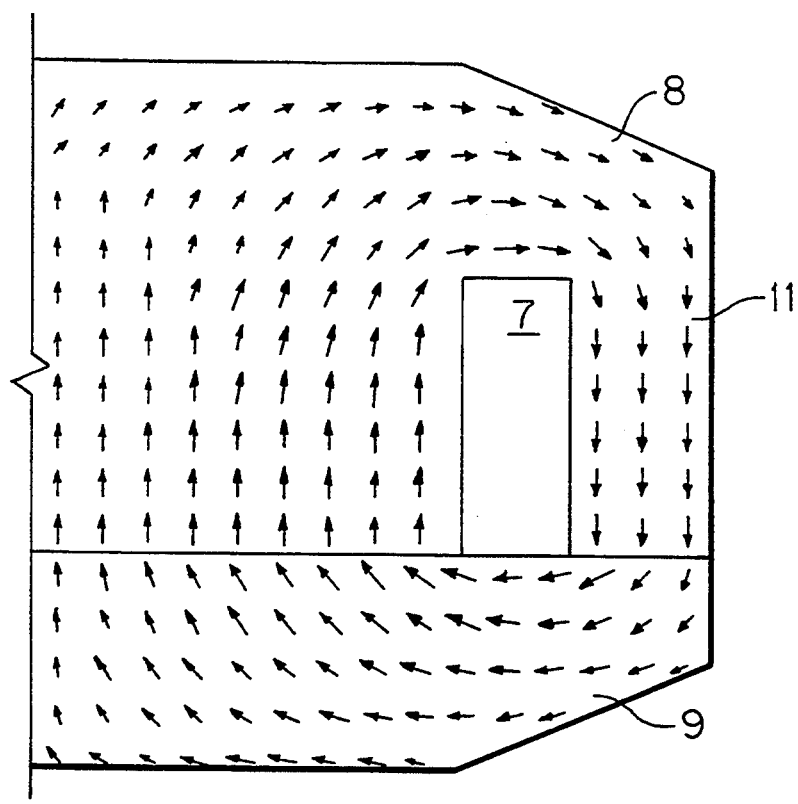
FIG. 5 represents the flow of magnetic flux through the magnet shown in FIG. 3.
Figure 6:
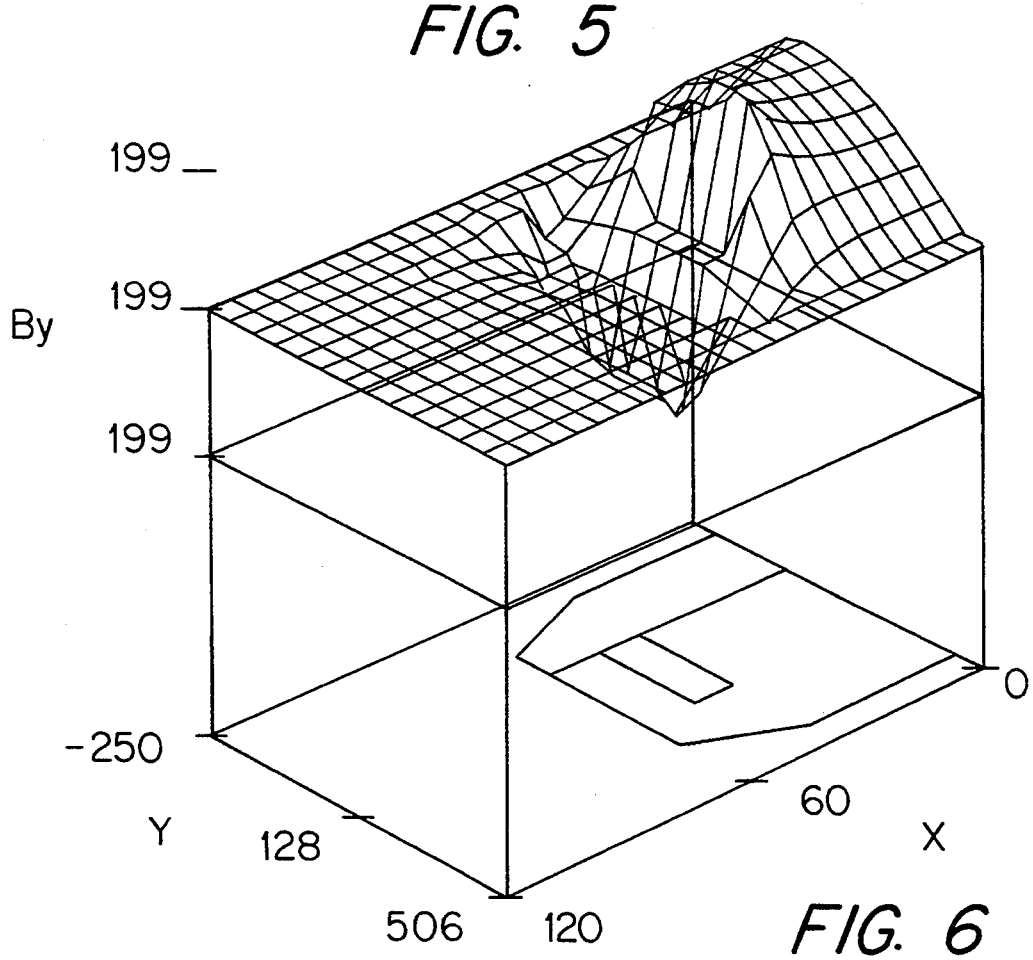
FIG. 6 shows a flux density profile for the magnet shown in FIG. 4.

The above-described magnet design results in magnetic flux being directed through the magnet as shown by arrows 11 in FIG. 5. In a preferred embodiment, both the keeper plate member and the housing member of the magnet are made of 1018 cold rolled steel. The resulting flux density profile for this magnet is shown in FIG. 6. Although the magnets used with the present invention are round, with the above-described dimensions, the magnets may be of any suitable shape and size which will provide the desired power to withstand the force of impact in the event of an accident.

The keeper plate and the housing member are arranged in the bumper assembly such that they repel each other. The gap between the keeper plate and the housing member is maintained by the repellant force. A bumper assembly according to the present invention protects a vehicle, at least in part, with the force between the keeper plate and the housing member force which is required to force apart these two members by 0.02 inches. In preferred embodiments, at least 7,500 pounds of force is required to close the gap. By adding additional magnets to the bumper assembly, the ability of the bumper assembly to withstand the effects of a collision may be increased. Therefore, the bumper assembly of the present invention may provide a vehicle with an ability to withstand collisions of a great force.

The equations below show size of magnet necessary to produce a desired amount of force. In particular, the equations show how the above-described dimensions derived. A different sized magnet or a magnet producing a different force could be derived using the equations.

EXAMPLE

In the following example, the following calculations regarding the strength and size of the magnets were based on a theoretical force of impact of 60,000 pounds on the bumper. The embodiment in this example assumes that eight magnets will be used in the bumper assembly, providing force of 7,500 pounds from each magnet to achieve the total of 60,000 pounds withholding power. Of course, the load bearing capacity and the size and number of magnets may be altered to provide the desired degree of protection to the vehicle and its contents.

Each electromagnet creates a magnetic filed in the air gap when a voltage is applied to the coil. The effect of the magnetic field is to exert a repellant force that keeps the 0.02 inch gap between the two parts. The expression for the force is defined quantitatively as follows:

$$F = \tfrac{1}{2} B^2 A / 2 M_o,$$

where
F = Force (Newtons)
B = Flux density of magnetic filed (Tesla) in air gap
A = Area of air gap (Meters$^2$)
$M_o$ = Permeability of air $4\pi \times 10^3$ (svm)

Manipulating the equation produces the following result:

$$F/A = \tfrac{1}{2} B^2 / M_o$$

Assuming, for this Example, that 1.20 Tesla can be generated in the air gap, then:

$$F/A = \tfrac{1}{2}(1.2)^2 / 4\pi \times 10^{-7}$$
$$= 5.729 \times 10^5 \text{ N/m}^2$$
$$F/A = 83.0 \text{ lbs./in}^2$$

In this Example, each magnet supports 7,500 pounds, then F = 7500, and A(the area of the air gap) = 7500/83.0 = 90.3 square inches. Assuming that a round electromagnet will be used, then:

$$A = \pi/4 D_m^2$$
$$D_m = \sqrt{(4/\pi) A}$$
$$D_m = \sqrt{(4/\pi)(90.3)}$$
$$D_m = 10.17''$$

Accordingly, 8 electromagnets that are approximately 10.7 inches in diameter would be needed to repel a force of 60,000 pounds.

The following represents the calculations showing what dimensions for the magnet would be required to produce the force stated above for the Example.

(1) $Ap = \pi r_1^2 = \pi(r_0^2 - r_2^2)$
(2) $b = r_1/2$
(3) $F = (2)\tfrac{1}{2}(B_g^2 \cdot Ap)/M_0 = (B_y^2/M_0)\pi r_1^2$
(4) $Bg = B_c/K_1$
(5) $(B_y)(2g)/M_0 + H_i l_i = N1$
$P_{in} = I^2 R = [I^2 p 2\pi(r_1 + r_2) N^2]/[2 K_f h(r_1 - r_1)]$ -continued
(6) $P_{in} = \{I^2 P\pi[1 + (r_2/r_1)]N^2]\}/\{K_f h[(r_2/r_1)]\}$
(7) $P_{out} = K_h 2\pi h r_1[1 + (r_2/r_1)]$
$F_c = 7500\# = 33,333 \text{ N}$
$K_h = 1.0$ watts m$^2$
$g = .020'' = 5.08E\text{-}4m$
$P = 1.73E\text{-}8 (1 + .00393\Delta T), K_f = 0.50$
$P = 1.73E\text{-}8 (1.55) = 2.68E\text{-}8 @ \Delta T = 160°\text{-}20° \text{ C.}$
$K_1 = 1.20, B_c = 1.4, H_i l_i = 200 r_1''$ pp 254
(4) $B_y = 1.2$ pp 255, $B_i = 1.2(1.2) = 1.44$
(3) $33,333 = [(1.02)^2 \pi r_1^2]/M_0$
$r_1 = 3.78''$
(2) $b = 3.88/2$
$= 1.89''$
(5) $N1 = \{[1.20(2)5.08E\text{-}4]/M_0\} + 756$
$= 1726$
(6) $P_{in} = \{(946)^2 2.68E\text{-}8(\pi)[1 + (r_2/r_1)]\}/0.5h[(r_2/r_1) - 1]$
For $h = 3.00'' = .0762m$
$P_{in} = 6.59[1 + (r_2/r_1)]/[(r_2/r_1) - 1]$ watts
(7) $P_{out} = 2\pi 3(3.78)[1 + (r_2/r_1)] = 71.2[1 + r_2/r_1)$ watts,
$Kh = 1$ w/in
For $h = 2.00''$ $P_{in} = 9.88[1 + (r_2/r_1)]/[(r_2/r_1) - 1]$
$P_{out} = 47.5[1 + (r_2/r_1)]$
For $h = 3$: $P_{in} = P_{out}$
$6.59/[(r_2/r_1) - 1] = 71.2$
$r_2/r_1 = 1.093$
$r_2 = 4.13, \Delta r = 4.13 - 3.78 = 0.35''$
$h/\Delta r = 3/0.35 = 8.6$, should be $<4$ pp 256
For $h = 2$: $9.88/[(r_2/r_1) - 1] = 47.5$
$(r_2/r_1) = 1.208$
$r_2 = 4.57'', \Delta r = 4.57 - 3.78 = 0.79$
$h/\Delta r = 2/0.79 = 2.53$
$r_1 = 3.75'', r_2 = 4.75'', \Delta r = 1.0, h = 2.5''$
$3.75^2 = r_0^2 - 4.75^2$
$r_0 = 6.00''$
$b = 3.75/2 = 1.86$ Magnets of other dimensions, the total force exerted by the magnets, and the number of magnets used, among other variables, may be altered and recalculated according to the above equations to arrive at other examples.

What is claimed is:

1. A bumper assembly for attachment to a vehicle body, said bumper assembly comprising:
   at least one elongate bumper member about as long as a width of the vehicle body, said bumper member being attached to a surface of the vehicle body facing a direction of travel of the vehicle and
   at least one magnet member, said magnet member including a magnetic housing member and a magnetic keeper plate member, said housing member being attached to a frame of said vehicle facing the direction of travel of the vehicle, said keeper plate member being attached to said bumper member co-axially with said housing member, said keeper plate member and said housing member being separated by a gap and repelling each other when said bumper assembly is attached to said vehicle.

2. The bumper assembly according to claim 1 further comprising a second elongate bumper member about as long as a width of the vehicle body, said second bumper member being attached to a surface of the vehicle body facing opposite the direction of travel of the vehicle body and
   at least one magnet member, said magnet member including a magnetic housing member and a magnetic keeper plate member, said housing member being attached to a frame of said vehicle opposite the direction of travel of the vehicle body, said keeper plate member being attached to said second bumper member co-axially with said housing member, said keeper plate member and said housing member being separated by a gap and repelling each other when said bumper assembly is attached to said vehicle.

3. The bumper assembly according to claim 1, wherein said bumper assembly includes eight magnets.

4. The bumper assembly according to claim 3, wherein each of said magnets is capable of withstanding 7,500 pounds of force to close said gap between said housing member and said keeper plate.

5. The bumper assembly according to claim 1, wherein at least one member of said magnet is at least partially encompassed by said bumper.

6. The bumper assembly according to claim 2, wherein at least one member of said magnet is at least partially encompassed by said bumper.

7. The bumper assembly according to claim 1, wherein said magnets are arranged in two rows, one in front of the other.

8. The bumper assembly according to claim 2, wherein said magnets are arranged in two rows, one in front of the other.

* * * * *